July 12, 1927.
T. E. MURRAY, JR
1,635,335
WHEEL WITH DRUM
Original Filed March 11, 1924
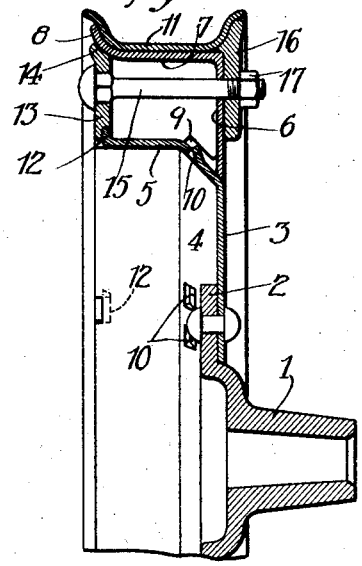
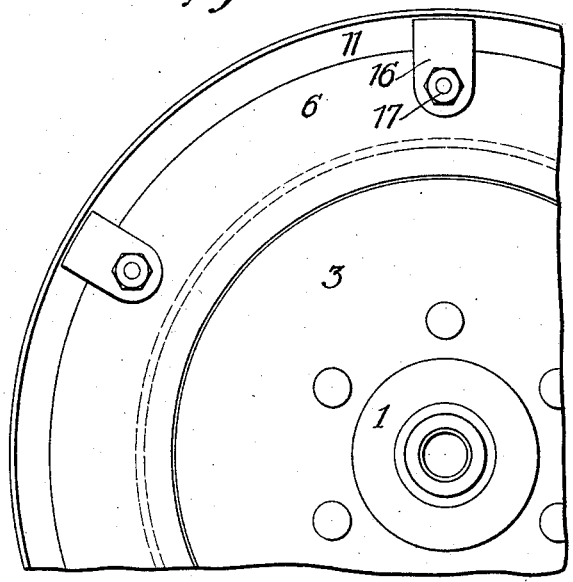
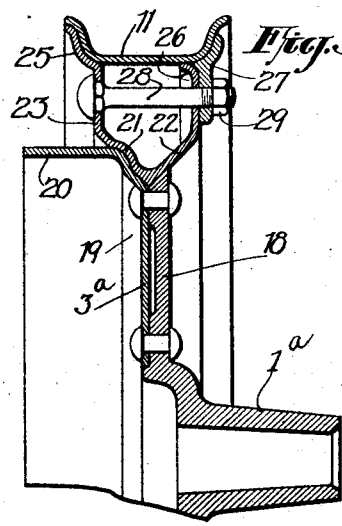
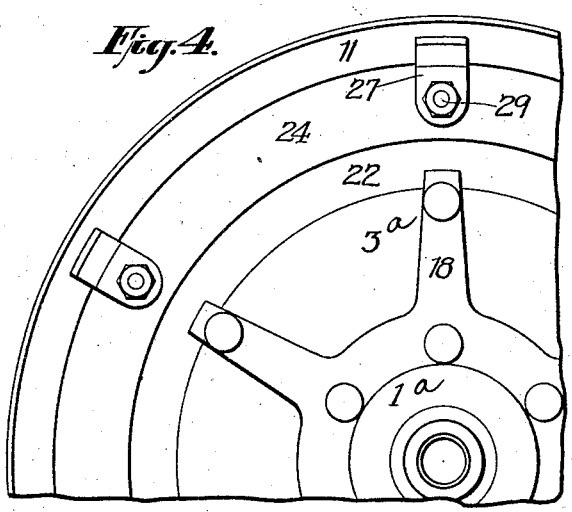
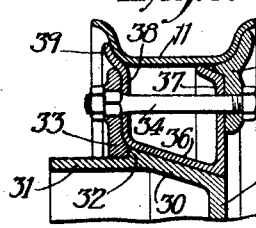
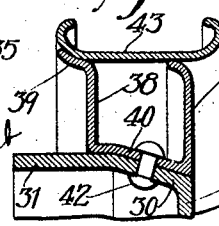
INVENTOR
THOMAS E. MURRAY, JR.
BY
N. Anthony Usina
ATTORNEY Patented July 12, 1927.

1,635,335

UNITED STATES PATENT OFFICE.

THOMAS E. MURRAY, JR., OF BROOKLYN, NEW YORK.

WHEEL WITH DRUM.

Application filed March 11, 1924, Serial No. 698,399. Renewed May 25, 1927.

My invention aims to provide an improved construction of automobile wheels with brake drums. The accompanying drawings illustrate embodiments of the invention.

Fig. 1 is a radial section and Fig. 2 an outside elevation of part of an automobile wheel;

Figs. 3 and 4 are similar views of a modification;

Figs. 5, 6 and 7 are radial sections of the outer portions of a wheel, illustrating alternative modifications.

Referring first to Fig. 1, a hub 1, designed for attachment to the driving shaft has a flange 2 to which is riveted, or it may be otherwise attached, a disc 3. At its outer edge the disc has a radially flared portion 4 and an axial flange 5.

Outside of the disc is located a felloe. This comprises a disc portion 6 and an axially extending portion 7, slightly tapered inwardly, on the outside edge of which is an outwardly extending flange 8. The inner edge of the felloe is provided with tongues or short flanges 9 at intervals which are laterally engaged with similar tongues or flanges 10 bent outwardly from the part 4 of the wheel disc. Each tongue 9 is locked between a pair of tongues 10 as indicated near the middle of Fig. 1.

A demountable rim 11 fits on the part 7 of the felloe and is stopped by the flange 8. The axial flange 5 constitutes an inside brake drum. It is provided at intervals with tongues or short flanges 12 at its edge which serve as stops for a fastening ring 13 fitting over the drum and having an outer edge or flange 14 fitting within the part 7 and over the flange 8 of the felloe. The fastening ring 13 carries bolts 15 passing through the felloe and through clips 16. Nuts 17 on the ends of the bolts serve to draw the parts together and to hold the felloe firmly on the disc. The outer ends of the clips bear also against the demountable rim 11 and hold the latter against the flange 8. In demounting the rim, the bolts are loosened and the clips turned so as not to interfere with the rim, after which the nuts may be turned up to hold the felloe in place while the rim is withdrawn.

According to Figs. 3 and 4 the hub 1ª has radial arms 18 riveted to the disc 3ª at their outer ends as well as near the center. The disc 3ª has a radially flared portion 19 to hold the felloe and also an axial drum portion 20.

The felloe has tapered shoulders 21 and 22 at its inner edge which are continued in disc portions 23 and 24. The former fits within the rim 11 and has a stop flange 25 for holding the rim. The part 24 has also a flange 26 fitting within the rim. Fastening clips 27 are drawn up by bolts 28 passing through the two disc portions of the felloe, with nuts 29 on outer ends.

The felloe is held in place by the arms 18 of the hub which overlap the shoulder 22 of the felloe, so that the latter is fastened between these arms and the shouldered portion 19 of the disc 3ª. The drum 20 in this case is extended sufficiently to serve for an outside brake as well as an inside one.

Figs. 5, 6 and 7 illustrate other methods of mounting the felloe on the disc. In Fig. 5 the disc 3ᵇ has a tapered portion 30 to form a shoulder for the felloe and a drum 31 extended so as to be used both for an inside and an outside brake, and has a shoulder 32 on the outside for engagement by a fastening ring 33 carrying the bolt 34 by which the felloe is held in place and the clips 35 are forced up against the rim 11. The felloe has a tapered portion 36 fitting the tapered shoulder 30 of the disc and has portions 37 and 38 on which the rim is centered, the part 38 having a stop flange 39 for the rim.

According to Fig. 6 the disc has a tapered shoulder portion 30 and a brake drum 31; and the felloe has a part 40 fitting around the disc and fastened by rivets 42. The parts 37 and 38 of the felloe are the same as in Fig. 5. A different type of rim 43 is illustrated. It is fastened by clips and bolts passing through the felloe as in Fig. 3, or by various other means. In fact in all the wheels illustrated any usual or suitable style of rim may be used, permanent or demountable, and any usual or suitable means for fastening it in place.

According to Fig. 7 the disc 3ᶜ has a pair of shoulders or a rib formed by the parts 44 and 45 inclined in opposite directions, and a drum 46. The felloe is interlocked with the ribbed portion of the disc. For this purpose it has, besides the portions 37 and 38, an inner wall formed of the two parts 47 and 48 which embrace and fit on the parts 44 and 45 of the rim. This permanent mounting of the felloe on the disc may be effected by first shaping the latter and then pressing the felloe on it, or by first shaping the felloe and then expanding the parts 44 and 45 of the disc into the groove of the felloe.

In each of the cases described the felloe is wedged on the disc and the rim wedged on the felloe to the limits of their movement in an axial direction so that the parts are held to a close fit on one another.

In the constructions of Figs. 1 and 5, a common fastening means is used for holding the parts together consisting of the bolt carried by the felloe and the clips which are held by the bolt in operative engagement with the disc and rim respectively. The entire fastening means consists of bolts and separate clips of this sort arranged at intervals around the circumference. Instead of separate clips, rings may be used extending continuously around, such as are sometimes employed for clamping demountable rims in place.

Though I have described with great particularity of detail certain embodiments of my invention, yet it is not to be understood therefrom that the invention is restricted to the particular embodiments described. Various modifications may be made by those skilled in the art without departure from the invention as defined in the following claims.

What I claim is:

1. A vehicle wheel comprising a disc formed with a laterally extending integral brake drum flange which is united to the body of the disc by an inclined portion and a felloe having an outer rim supporting part and an inner part shaped for wedged engagement with said inclined portion of the disc.

2. A vehicle wheel comprising a disc formed with a laterally extending integral brake drum flange which is united to the body of the disc by an inclined portion, and a felloe having a part shaped for wedged engagement with said inclined portion and integral interengaging parts on said rim and felloe arranged to lock them against relative circumferential movement.

3. A vehicle wheel comprising a disc formed with a laterally extending integral brake drum flange which is united to the body of the disc by an inclined portion and a felloe having a part shaped for wedged engagement with said inclined portion and a tongue struck up from said disc, and a projection on said felloe co-acting with said tongue arranged to lock the felloe and disc against relative circumferential movement.

In witness whereof, I have hereunto signed my name.

THOMAS E. MURRAY, Jr.